Patented May 6, 1947

2,420,233

UNITED STATES PATENT OFFICE 2,420,233

PRODUCTION OF ALUMINUM SALTS OF ORGANIC ACIDS

Lawrence John Edwards, Stratford, London, England, assignor to A. Boake, Roberts & Company Limited, Stratford, London, England, a British company No Drawing. Application August 31, 1944, Serial No. 552,218. In Great Britain September 7, 1943

20 Claims. (Cl. 252—37.2)

This invention relates to the manufacture of viscosity-increasing agents for hydrocarbon oils.

It is known to produce what will be referred to herein as "aluminum soaps" but which are believed to be adsorption complexes of hydrated aluminum oxide with an organic acid (stearic acid in the case of aluminum stearate) in contrast to being stoichiometrical compounds of fixed constitution, by a wet precipitation process effected in an aqueous medium and consisting in bringing together in solution in said medium a water-soluble salt of aluminum, and either a water-soluble salt (e. g., an alkali metal soap) of the organic acid constituent of the "aluminum soap" to be produced or the organic acid itself plus a water-soluble alkali hydroxide or carbonate the temperature during the process being suitable to a melted condition of the organic acid employed. The product of the reaction is believed to be a composite precipitate consisting of hydrated alumina with fatty acid adsorbed upon it and the said product, at the end of the reaction, being filtered from the mother liquor in which it has been formed and dried to the form of a substantially dry powder dispersible as such in hydrocarbon oils.

The object of the present invention is to provide an improved process as compared with the known procedure, characterised principally by ready reproducibility of the results when operating on a manufacturing scale, by ease of conduct of the process and as regards the product by an improved measure of gelling power and inherent stability. By "gelling power" is meant the power of the product to gel or increase the viscosity of a hydrocarbon oil to which it is added. By "inherent stability" is meant the ability of the product to retain its initial gelling power with age, both prior to dispersion of the product in a hydrocarbon oil and also after such dispersion.

According to the invention, a process for the manufacture of a viscosity-increasing agent for hydrocarbon oils comprises the following steps: (1) precipitating hydrated aluminum oxide in an aqueous medium by interaction in solution therein of a water-soluble salt of aluminum and a water-soluble alkali, the precipitation being effected under conditions of agitation of the aqueous medium, under substantially non-alkaline conditions thereof and in the presence in dispersion in the medium of (a) a soap-forming fatty acid and (b) a hydrophylic colloid, thereby forming a composite precipitate filterable as such from the aqueous medium in which it has been formed and consisting of an "aluminum soap" as herein referred to carrying a proportion at least of the colloid that was present in said medium, (2) filtering the aluminum soap from the aqueous medium and (3) drying it to the form of a substantially dry powder dispersible as such in a hydrocarbon oil.

The improved process as thus outlined has been extensively investigated and the investigations have shown—

(A) That the colloid used can be practically any hydrophylic colloid, suitable examples being gelatine, glue, albumen, gum arabic, polyvinyl alcohol, methyl cellulose, isinglass, starch, agar agar and saponin.

(B) That it is of importance, more particularly for reproducibility of the results in the process as hereinbefore referred to, to maintain a close control of the pH of the reactant bath throughout the whole of the reaction, including the closing phase thereof, when usually there is a tendency for the pH to increase rather rapidly. For best results, generally speaking, it should not substantially exceed 5 for any extended length of time and should be so controlled in the course of the reaction as at the finish thereof to be actually in the neighbourhood of this figure; if necessary or if desired, a buffer salt can be used for the purposes of the control.

(C) That the order in which the components to form the reactant bath are brought together is also important, best results being usually obtained when the water-soluble alkali component, for example and according to a generally preferred procedure, in the form of an alkali metal soap of the fatty acid component of the bath to be produced, is added in aqueous solution to an aqueous solution of the aluminum salt component as in the specific example of the invention hereinafter described, as in this case the conditions of precipitation are generally the most favourable from the point of view of ensuring the necessary close control of the pH of the bath during the reaction.

(D) That for best results as regards the gelling power, inherent stability and uniformity of the product and also reproducibility of the results in the process, the composite precipitate as formed in the reactant bath should be matured in situ therein by allowing the precipitate to remain in its mother liquor for a period of hours with maintenance of the conditions of agitation and substantial non-alkalinity of the bath, the pH thereof being so controlled during the maturing period as to finish at the end of the period at a figure in the neighbourhood of 5; also that a generally preferred method of carrying the process into effect is one in which the precipitation step (1) is effected in two successive stages following one another in a continuous manner—a first stage, in which an aqueous solution of an alkali metal soap is added to an aqueous solution of a water-soluble aluminum salt, with resulting precipitation of the bulk of the precipitatable hydrated alumina available in the solution, and a second stage, in which with caution an aqueous solution of an alkali is added to the bath to cause the precipitation of a further quantity of such precipitatable alumina.

(E) That as in the known process referred to, the fatty acid component of the reactant bath may be added in the preparation of the bath either as the free acid or in the form of a water-soluble salt (e. g., an alkali metal soap) thereof, the alkali thus introduced, in the event of the fatty acid component being added in the form of an alkali metal soap of the acid, providing, at least in part, the required water-soluble alkali component of the bath.

(F) That practically any water-soluble alkali forming a water-soluble salt with the anion of the aluminum salt may be used.

(G) That efficient agitation, as by stirring, during the progress of the reaction and during the subsequent maturing step (if employed) of the process is important in order to ensure thorough mixing of the ingredients of the bath and thereby the avoidance of any local stagnation which has been found to be inimical to complete success in the process.

The investigations have further shown that the presence of a hydrophylic colloid in the aqueous medium of precipitation of an "aluminum soap" as herein referred to, as compared with the absence thereof, conditions being otherwise comparative in the two cases, results in greater ease and facility of manufacture of the products to be obtained, a higher degree of uniformity of said products and a greater measure of reproducibility of the results obtainable in the process. In addition, the filterable precipitates obtained tend to be of a porous and granular texture in contrast to the slimy precipitates which are obtained when precipitation is effected in the absence of a hydrophylic colloid, and further, the volume of the separated and dried product is substantially less than when precipitation is effected in the absence of a hydrophylic colloid, which is an indication that the steps of filtering and washing the precipitate prior to the drying operation have been facilitated and rendered more complete as the result of the presence of the hydrophylic colloid during the precipitation step.

For the attainment of these desirable results, the hydrophylic colloid need only be used in comparatively small amount, as in the specific example of the invention which is hereinafter described, where the colloid used is glue and the amount employed is only about 0.15% by weight of the total contents of the reactant bath. It will be appreciated, therefore, that the use of a hydrophylic colloid in the process of the present invention is something quite different from the use of a protective colloid in a process in which a stable emulsion is to be produced, the colloid serving either as an emulsifying agent or as a stabiliser for such an agent. In such a process the colloid concentration of the mass would generally be much higher than that represented by such a small percentage as 0.15% and as a matter of fact in many cases of actual practice of the process of the present invention the colloid concentration can be very much less than 0.15%.

As already remarked, it is believed that "aluminum soaps" as herein referred to are adsorption complexes of the freshly precipitated hydrated alumina and the soap forming fatty acid in the presence of which the hydrated alumina has been formed and the investigations referred to in the foregoing all tend to the conclusion that the function of the hydrophylic colloid in the process of this invention is to assist the fatty acid component of the reactant bath in maintaining the particle size of the hydrated alumina as first formed in the bath, which conclusion is supported by the fact that the colloid appears in the final product as a constituent part thereof, presumably adsorbed upon the hydrated alumina along with the fatty acid constituent of the product. Further, in contrast to a case where a protective colloid is used to assist in producing a stable emulsion, the process of the present invention necessitates the employment of efficient mechanical agitation of the reactant bath in order to ensure the necessary high degree of dispersion of the precipitated particles in the bath for the purposes of the process, and of course the product of the process as regards the aqueous mass which obtains at the end of the precipitation step is a product which is filterable as respects the dispersed solids in contrast to a stable emulsion which, of course, is non-filterable in this sense.

The organic acid used in the process, by which is meant the organic acid from which the water-soluble organic acid salt used has been derived, or as the case may be, the free acid, is generally a higher molecular weight (above 100) acid, examples which have been found to be particularly suitable for the purposes of the present invention being caproic, lauric, stearic, palmitic, oleic, ricinoleic and naphthenic acids, used either separately or two or more in admixture.

For convenience, specific soaps as produced by the process of the present invention will be referred to herein by reference to the particular organic acids from which they have been produced, for example "aluminum stearate" in the case when the organic acid employed was stearic acid or the fatty acid material generally known in the trade as "stearic acid."

It is found that by operating in accordance with the present invention as outlined in the foregoing, "aluminum soaps" can be produced which besides being of highly uniform quality, possess an extremely high gelling power, even when dispersed in hydrocarbon oils which have been peptised by the addition to them of a peptising agent, for example pure benzenes which have been peptised by the addition of a few percent. of phenol. Also, the results in the process are readily reproducible when operating on a manufacturing scale and the process is easy to operate.

The following example will serve to illustrate the invention as applied to the production of an aluminum stearate soap with the use of conditions carefully chosen to give a high measure of gelling property and inherent stability of the product as referred to above:

280 parts by weight of aluminum sulphate (16.5-17% $Al_2O_3$) were dissolved in 5,000 parts by weight of water. The resulting solution was heated to 60° C. Into the solution was then introduced at 60° C. a solution of glue formed by dissolving 15 parts by weight of low-viscosity cold-water-soluble glue in 100 parts by weight of water. Immediately thereafter a solution of soap formed by dissolving 464 parts by weight of commercial stearic acid (acid value 205, melting point 53° C.) in 6,000 parts by weight of water containing 10 parts by weight of acetic acid and 75 parts by weight of caustic soda, was run at 60° C. into the mixed solution of aluminum sulphate and glue with thorough stirring during the running in of the soap solution. The acetic acid as sodium acetate in the aqueous medium exerts a favourable buffering action for the complete precipitation of the aluminum soap. The whole of the addition took place in about half an hour at 60° C. at which time the pH of the bath was in the neighbourhood of 3.5–4.0 due to the addition of the specified amount of substantially neutralised alkali stearate in solution to the warm solution of aluminum sulphate, the bulk of the aluminum soap precipitatable from the reactants was formed in a highly dispersed condition and as a precipitate with a fine granular texture free from lumps. A 10% aqueous solution of soda ash was then added without interruption of the process and with continued stirring until the pH of the bath had been brought to 5.2. This resulted in the precipitation of further but smaller quantities of the aluminum soap. The stirring of the mixture at the stated temperature was then continued for about 5 hours, with periodic cautious addition of further small quantities of soda ash solution in order to maintain the pH at 5.2, care being taken throughout the reaction to prevent the pH from at any time exceeding 5.3. The precipitate formed was then filtered off, washed with water previously acidified to a pH of 4.5 with acetic acid, until substantially free from sodium sulphate, and finally dried in a current of air at a temperature of 90–95° C. By analysis the dried product was found to have the following characteristics:

|   | Per cent |
|---|---|
| Insoluble ash | 9.4 |
| Equivalent to aluminum content of | 5 |
| Soluble ash | .75 |
| Free stearic acid (extracted by cold alcohol) | 3.4 |
| Glue (calculated from nitrogen content) | 2.4 |

It was not acid to methyl orange nor alkaline to brom-cresol purple.

The following comparative viscosity tests will serve to demonstrate the effect obtained in the invention under the conditions of the example, or under these conditions modified as indicated, as regards increase of "gelling property." The viscosity measurements in the tests, except where otherwise stated, were made by observing the time in seconds of fall of a $\frac{3}{32}$" diameter steel ball over a 5 cm. constant velocity drop through a solution of the aluminum stearate in benzene, prepared by adding 5 grammes of the aluminum soap in 100 ccs. of pure benzene containing 3 grammes of phenol, heating the resulting solution to 50° C. until the soap is completely dispersed, cooling it to 25° C. and then maintaining it at this temperature for 24 hours, the test being made at a temperature of the solution of 25° C.

*Tests 1, 2, 3 and 4.*—In these tests, four samples of aluminum soap were made in accordance with the foregoing example by different observers. The times of fall of the ball were 120 seconds, 134 seconds, 145 seconds and 125 seconds respectively, the average time being 131 seconds.

*Tests 5 and 6.*—In these tests, two samples of aluminum soap were made in accordance with the foregoing example, with the exception that the protective colloid was omitted. The pH of the reaction mixture was kept below 5.3 as in the example throughout the process. The products and tests were made by different observers and the times of fall of the ball were 12 seconds and 10 seconds respectively.

*Test 7.*—In this test, a sample of aluminum soap was made in accordance with the foregoing example, except that the protective colloid was omitted and in addition the pH of the reacting solution was brought to over 8, by addition of an excess of sodium carbonate, at the end of the process. The time of fall of the ball was 2 seconds.

*Test 8.*—In this test, a sample of aluminum soap was made in accordance with the foregoing example and, therefore, with the use of glue as the protective colloid, except that the pH of the reacting solution was brought to between 7 and 8 by addition of a slight excess of sodium carbonate, at the end of the reaction. The time of fall of the ball was 42 seconds.

*Tests 9, 10, 11, 12, 13, 14, 15, 16 and 17.*—In these tests, samples of aluminum soap were made in accordance with the process of the invention under conditions as specified in the foregoing example, using the following colloids in the process and operating with a pH of under 5.3 as in the example. The following viscosity results were obtained:

| Test | Colloid | Time of fall of ball |
|---|---|---|
|  |  | Seconds |
| 9 | Gelatine (10 parts) | 68 |
| 10 | Methyl cellulose (5 parts) | 169 |
| 11 | Methyl cellulose (10 parts) | 170 |
| 12 | Polyvinyl alcohol (5 parts) | 205 |
| 13 | Polyvinyl alcohol (10 parts) | 238 |
| 14 | Gum arabic (5 parts) | 30 |
| 15 | Soluble starch (10 parts) | 28 |
| 16 | Albumen (10 parts) | 137 |
| 17 | Saponin (10 parts) | 88 |

*Tests 18 and 19.*—In these tests, the samples of aluminum soap used were similar to those that were used in tests 1 and 5 respectively, that is, made according to the foregoing example but with and without glue as the colloid respectively, but the viscosity measurements were made with solutions of the aluminum soap in pure xylol (i. e. without phenol). The viscosity of the material in the case of test 18 was too high for accurate measurement, while the time of fall of the ball in the case of test 19, that is, in the case of the material made without a colloid, was as low as 5 seconds.

*Test 20.*—In this test, two samples of aluminum soap were made by a method analogous to the foregoing example, using commercial lauric acid (acid value 260) with glue as the protective colloid in the process and with maintenance of the pH below 5.3. A solution in benzene containing phenol was prepared as in tests 1 to 17, except that the aluminum soap was dispersed at 25° C. instead of at 50° C. The tests were made by different observers and the times of fall of the ball were 100 seconds and 106 seconds respectively.

*Test 21.*—In this test, a sample of aluminum soap was made by a method analogous to the foregoing example, but in the absence of a protective colloid. The pH of the bath was kept below 5.3, and the sample of aluminum soap obtained was dispersed in benzene as in test 20. The time of fall of the ball was 24 seconds.

Without binding ourselves as to the correctness or otherwise of theoretical considerations expressed, it is our view that the conditions of precipitation in the process of this invention should be based on the realisation that, as already remarked, "aluminum soaps" as herein referred to are not stoichiometrical compounds of fixed composition, but adsorption complexes of hydrated alumina and the fatty acid used in the process of manufacture of the soap; that it is a reasonable assumption that the greater the degree of interadsorption as between these two disperse systems, the more stable will be the resulting product in its gels in organic solvents. In this respect the size of the primary particles of hydrated alumina formed in the reactant liquid used as adsorbing media is consequently of importance in the process. This reasoning leads to the considered conclusion that the greater the degree of initial dispersion of the precipitate as first formed in the bath, the greater will be the gelling power of the finished product.

Accordingly the reactants and procedure employed in the above described example have been carefully chosen so as to provide as nearly as possible optimum conditions for the production of a very highly dispersed hydrated alumina, considering the newly-born precipitate in the reactant bath. The adsorption of the fatty acid (e. g., stearic acid) by the alumina, normally takes some time completely to cover the surface area of alumina available. During this time the primary particles of alumina may unite to form larger particles, that is to say, a crystallisation of the alumina may occur with consequent reduction in the total surface area available for adsorption and decrease also in the degree of dispersion of the alumina.

By precipitation of the alumina in the presence of a compound capable of slowing down or preventing this crystallisation, the initial large surface area of the primary particles of hydrated alumina is maintained and the fatty acid enabled to occupy this surface at leisure.

The hydrophylic colloid which is used in the process of this invention and which is preferably one of relatively high molecular weight, as are those which are enumerated earlier herein as suitable for use in the process, fulfills this function. Thus, a single particle of colloidal dimensions of a hydrophylic colloid is capable of adsorbing a large number of primary particles of hydrated alumina, thereby immobilising these particles and preventing their union with one another. At the same time, the greater part of the initial surface area of the hydrated alumina remains available for occupation by the fatty acid.

The adsorption of the alumina onto the hydrophylic colloid is rapid in comparison with the rate of adsorption of the fatty acid onto the alumina. The consequential advantages resulting from the increased dispersion of the alumina are as evidenced by the wide differences in the results obtained as to gelling property with respect to hydrocarbon oils in the foregoing comparative tests, with and without the presence of a protective hydrophylic colloid, such as glue, in the reactant bath.

For efficient use the hydrophylic colloids are employed in a sufficiency, by which is meant an amount as determined by trial, above which any further increase in the colloid concentration does not lead to a useful increase in gel strength. Sufficiency provides, for most effective use, an adequate concentration for protective action under the conditions of the reaction through the stage or stages in which the wet process is continued.

During the second stage of the two-stage procedure hereinbefore described, as regards the precipitation step (1) of the process, entrapped reactants become released from the freshly formed precipitate and a downward trend of pH takes place during the periods when no alkali is being added. Further small amounts of hydrated alumina are then precipitated by the cautious addition of dilute alkali, preferably as the carbonate, and preferably in the presence of a buffer incorporated in the bath and serving to maintain the pH thereof at or near 4.8, which pH has been found generally speaking to be the best suited to give the desired high degree of dispersion of the new-born alumina.

During the maturing period which follows the precipitation step (1) without interruption and with maintenance of agitation and temperature conditions and, if necessary, the addition of a reactant, and which may be considered as a better conditioning of the precipitate allied to the ultimate use thereof, there ensues a more even spread of the fatty acid over the available surface of the hydrated alumina, approximating more closely to a unimolecular covering of the same thereover.

The analysis of the well washed and dried precipitate in the production of aluminum soap in the example and the comparative tests which follow are regarded as indicative and confirmatory of these observations.

With the use of a sufficiently active hydrophylic colloid in the process, a high measure of gelling power of the product as compared with customary procedure in the art is attainable even when various departures are made from the particular conditions of the example, which are considered to be at or near optimum conditions. For example, by omitting the maturing step of the example, a measure of gelling power in benzene phenol solvent has been found experimentally to obtain equal to approximately two-thirds that obtained under tests 1 to 4, the viscosity value of the product being in this case 85 instead of 131.

By varying the pH conditions of the maturing step the following experimental results have been obtained: At the end of the second stage of the precipitation step (1) the pH of the bath was adjusted to about pH 6.5, 7.4 and 8.5 respectively and maturing was completed under these different pH values. The relative viscosity values of the well washed and carefully dried products so obtained were then determined for comparison with tests 1 to 4; that is, as compared with a process proceeding and ending up at or near pH 5. The results were viscosity values of approximately 100, 78 and 26 respectively, as compared with an average viscosity value of 131 under tests 1 to 4. Even the lowest viscosity value as obtained by maturing at a pH just over 7 was substantially higher than the best result obtained under optimum conditions without the use of a hydrophylic colloid (glue) as in the example and the comparison is even enhanced if in place of glue a more effective hydrophylic colloid is used, as for example, polyvinyl alcohol.

What I claim as my invention and desire to secure by Letters Patent of the United States is:

1. A process for the manufacture of a viscosity-increasing agent for hydrocarbon oils, which comprises the following steps: (1) precipitating hydrated aluminum oxide in an aqueous medium by interaction in solution therein of a water-soluble salt of aluminum and a water-soluble alkali, the precipitation being effected under conditions of agitation of the aqueous medium, under substantially non-alkaline conditions thereof and in the presence in dispersion in the medium of (a) a soap-forming fatty acid and (b) a hydrophylic colloid, thereby forming a composite precipitate filterable as such from the aqueous medium in which it has been formed and consisting of an "aluminum soap" as herein referred to carrying a proportion at least of the colloid that was present in said medium, (2) filtering the aluminum soap from the aqueous medium and (3) drying it to the form of a substantially dry powder dispersible as such in a hydrocarbon oil.

2. A process for the manufacture of a viscosity-increasing agent for hydrocarbon oils, which comprises the following steps: (1) precipitating hydrated aluminum oxide in an aqueous medium by interaction in solution therein of a water-soluble salt of aluminum and a water-soluble alkali, the alkali reactant being added to an aqueous solution of the aluminum salt and the precipitation being effected under conditions of agitation of the aqueous medium, under substantially non-alkaline conditions thereof and in the presence in dispersion in the medium of (a) a soap-forming fatty acid and (b) a hydrophylic colloid, thereby forming a composite precipitate filterable as such from the aqueous medium in which it has been formed and consisting of an "aluminum soap" as herein referred to carrying a proportion at least of the colloid that was present in said medium, (2) filtering the aluminum soap from the aqueous medium and (3) drying it to the form of a substantially dry powder dispersible as such in a hydrocarbon oil.

3. A process for the manufacture of a viscosity-increasing agent for hydrocarbon oils, which comprises the following steps: (1) precipitating hydrated aluminum oxide in an aqueous medium by interaction in solution therein of a water-soluble salt of aluminum and a water-soluble alkali, the precipitation being effected under conditions of agitation of the aqueous medium, at a pH thereof not substantially exceeding 5 for any extended length of time and in the presence in dispersion in the medium of (a) a soap-forming fatty acid and (b) a hydrophylic colloid, thereby forming a composite precipitate filterable as such from the aqueous medium in which it has been formed and consisting of an "aluminum soap" as herein referred to carrying a proportion at least of the colloid that was present in said medium, (2) filtering the aluminum soap from the aqueous medium and (3) drying it to the form of a substantially dry powder dispersible as such in a hydrocarbon oil.

4. A process for the manufacture of a viscosity-increasing agent for hydrocarbon oils, which comprises the following steps: (1) precipitating hydrated aluminum oxide in an aqueous medium by interaction in solution therein of a water-soluble salt of aluminum and a water-soluble alkali, the precipitation being effected under conditions of agitation of the aqueous medium, under substantially non-alkaline conditions thereof and in the presence in dispersion in the medium of (a) a soap-forming fatty acid and (b) a hydrophylic colloid, thereby forming a composite precipitate filterable as such from the aqueous medium in which it has been formed and consisting of an "aluminum soap" as herein referred to carrying a proportion at least of the colloid that was present in said medium, (2) maturing the precipitate in the aqueous medium by allowing the reaction to continue for a period of hours under maintenance of conditions of agitation and substantial non-alkalinity of the aqueous medium, (3) filtering the matured precipitate from the aqueous medium and (4) drying it to the form of a substantially dry powder dispersible as such in a hydrocarbon oil.

5. A process for the manufacture of a viscosity-increasing agent for hydrocarbon oils, which comprises the following steps: (1) precipitating hydrated aluminum oxide in an aqueous medium by interaction in solution therein of a water-soluble salt of aluminum and a water-soluble alkali, the alkali reactant being added to an aqueous solution of the aluminum salt and the precipitation being effected under conditions of agitation of the aqueous medium, under substantially non-alkaline conditions thereof and in the presence in dispersion in the medium of (a) a soap-forming fatty acid and (b) a hydrophylic colloid, thereby forming a composite precipitate filterable as such from the aqueous medium in which it has been formed and consisting of an "aluminum soap" as herein referred to carrying a proportion at least of the colloid that was present in said medium, (2) maturing the precipitate in the aqueous medium by allowing the reaction to continue for a period of hours under maintenance of conditions of agitation and substantial non-alkalinity of the aqueous medium, (3) filtering the matured precipitate from the aqueous medium and (4) drying it to the form of a substantially dry powder dispersible as such in a hydrocarbon oil.

6. A process for the manufacture of a viscosity-increasing agent for hydrocarbon oils, which comprises the followings steps: (1) precipitating hydrated aluminum oxide in an aqueous medium by interaction in solution therein of a water-soluble salt of aluminum and a water-soluble alkali, the precipitation being effected under conditions of agitation of the aqueous medium, at a pH thereof not substantially exceeding 5 for any extended length of time and in the presence in dispersion in the medium of (a) a soap-forming fatty acid and (b) a hydrophylic colloid, thereby forming a composite precipitate filterable is such from the aqueous medium in which it has been formed and consisting of an "aluminum soap" as herein referred to carrying a proportion at least of the colloid that was present in said medium, (2) maturing the precipitate in the aqueous medium by allowing the reaction to continue for a period of hours under maintenance of conditions of agitation of the aqueous medium and of the pH thereof at a figure not substantially exceeding 5 for any extended length of time, (3) filtering the matured precipitate from the aqueous medium and (4) drying it to the form of a substantially dry powder dispersible as such in a hydrocarbon oil.

7. A process for the manufacture of a viscosity-increasing agent for hydrocarbon oils, which comprises the following steps: (1) precipitating hydrated aluminum oxide in an aqueous medium by interaction in solution therein of a water-soluble salt of aluminum and a water-soluble alkali, the precipitation being effected under conditions of agitation of the aqueous medium, at a pH thereof not substantially exceeding 5 for any extended length of time and so controlled as at the finish of the reaction to be near this figure and in the presence in dispersion in the medium of (a) a soap-forming fatty acid and (b) a hydrophylic colloid, thereby forming a composite precipitate filterable as such from the aqueous medium in which it has been formed and consisting of an "aluminum soap" as herein referred to carrying a proportion at least of the colloid that was present in said medium, (2) filtering the aluminum soap from the aqueous medium and (3) drying it to the form of a substantially dry powder dispersible as such in a hydrocarbon oil.

8. A process for the manufacture of a viscosity-increasing agent for hydrocarbon oils, which comprises the following steps: (1) precipitating hydrated aluminum oxide in an aqueous medium by interaction in solution therein of a water-soluble salt of aluminum and a water-soluble alkali, the precipitation being effected under conditions of agitation of the aqueous medium, at a pH thereof not substantially exceeding 5 for any extended length of time and in the presence in dispersion in the medium of (a) a soap-forming fatty acid and (b) a hydrophylic colloid, thereby forming a composite precipitate filterable as such from the aqueous medium in which it has been formed and consisting of an "aluminum soap" as herein referred to carrying a proportion at least of the colloid that was present in said medium, (2) maturing the precipitate in the aqueous medium by allowing the reaction to continue for a period of hours under maintenance of conditions of agitation of the aqueous medium and a control of the pH thereof resulting in said pH remaining at a figure not substantially exceeding 5 for any extended length of time throughout the maturing period and finishing at the end of said period at a figure in the neighborhood of 5, (3) filtering the matured precipitate from the aqueous medium and (4) drying it to the form of a substantially dry powder dispersible as such in a hydrocarbon oil.

9. A process as specified in claim 1, wherein step (1) is effected in two successive stages—a first stage, in which an aqueous solution of an alkali metal soap is added to an aqueous solution of a water-soluble aluminum salt, and a second stage, in which an aqueous solution of an alkali is added to the precipitation bath.

10. A process as specified in claim 7, wherein step (1) is effected in two successive stages—a first stage, in which an aqueous solution of an alkali metal soap is added to an aqueous solution of a water-soluble aluminum salt, and a second stage, in which an aqueous solution of an alkali is added to the precipitation bath.

11. A process as specified in claim 8, wherein step (1) is effected in two successive stages—a first stage, in which an aqueous solution of an alkali metal soap is added to an aqueous solution of a water-soluble aluminum salt, and a second stage, in which an aqueous solution of an alkali is added to the precipitation bath.

12. A process as specified in claim 1, wherein, following the filtering step and before the precipitate is dried, the latter is washed with an aqueous medium which is on the acid side of pH 7.

13. A process as specified in claim 7, wherein, following the filtering step and prior to the drying step, the precipitate is washed with an aqueous medium whose pH is substantially 5.

14. A process as specified in claim 8, wherein, following the filtering step and prior to the drying step, the precipitate is washed with an aqueous medium whose pH is substantially 5.

15. A process for the manufacture of a viscosity-increasing agent for hydrocarbon oils, which comprises the following steps: (1) precipitating hydrated aluminum oxide in an aqueous medium by interaction in solution therein of a water-soluble salt of aluminum and a water-soluble alkali, the precipitation being effected in two stages—a first stage, in which an aqueous solution of an alkali metal soap is added to an aqueous solution of a water-soluble aluminum salt with resulting precipitation of the bulk of the precipitatable hydrated alumina available in the solution, and a second stage, in which an aqueous solution of an alkali is added to the precipitation bath to cause the precipitation of a further quantity of said precipitatable alumina, and under conditions of agitation of the aqueous medium, at a raised temperature thereof, at a pH of the medium not substantially exceeding 5 for any extended period of time and in the presence in dispersion in the medium of (a) a soap-forming fatty acid and (b) a hydrophylic colloid, thereby forming a composite precipitate filterable as such from the aqueous medium in which it has been formed and consisting of an "aluminum soap" as herein referred to carrying a proportion at least of the colloid that was present in said medium, (2) maturing the precipitate in the aqueous medium by allowing the reaction to continue for a period of hours under conditions of continued agitation of the bath and a control of the pH thereof resulting in said pH remaining at a figure not exceeding 5 for any extended length of time throughout the maturing period and finishing at the end of said period at a figure in the neighbourhood of 5, (3) filtering the matured precipitate from the aqueous medium, (4) washing it with a substantially non-alkaline aqueous medium and (5) drying it in a current of hot gas to the form of a substantially dry powder dispersible as such in a hydrocarbon oil.

16. A process as specified in claim 15, wherein the alkali soap employed is an alkali metal stearate.

17. A process as specified in claim 15, wherein the aluminum salt used is aluminum sulphate.

18. A process as specified in claim 15, wherein the alkali metal soap employed is an alkali metal stearate, the aluminum salt used is aluminum sulphate and the colloid employed is glue.

19. An aluminum soap as herein referred to incorporating a proportion of a hydrophylic colloid as a constituent part thereof, the said soap being in the form of a substantially dry precipitate having the property of forming a gel when dissolved in pure benzene containing 3% of phenol by the following procedure of adding a sufficient quantity of the soap to a mixture of 3 parts of phenol and 97 parts of benzene to form a 5% solution of the soap therein, heating the resulting mixture to 50° C. to ensure complete solution of the soap, cooling the solution to 25° C. and maintaining it at this temperature for 24 hours.

20. An aluminum soap as herein referred to incorporating a proportion of free stearic acid extractible by cold alcohol and a proportion also of a hydrophylic colloid, as constituent parts thereof, the said soap being in the form of a substantially dry precipitate having the property of forming a gel whose viscosity is such that the time of fall of a $\frac{3}{16}$" diameter steel ball over a 5 cm. constant-velocity drop through the gel is at least 28 seconds, when dissolved in pure benzene containing 3% of phenol by the following procedure of adding a sufficient quantity of the soap to a mixture of 3 parts of phenol and 97 parts of benzene to form a 5% solution of the soap therein, heating the resulting mixture to 50° C. to ensure complete solution of the soap, cooling the solution to 25° C. and maintaining it at this temperature for 24 hours.

LAWRENCE JOHN EDWARDS.

REFERENCES CITED

The following references are of record in the file of this patent:

UNITED STATES PATENTS

| Number | Name | Date |
|---|---|---|
| 2,225,197 | Stagner | Dec. 17, 1940 |
| 2,015,864 | Muller | Oct. 1, 1935 |
| 2,015,865 | Muller | Oct. 1, 1935 |
| 1,259,708 | Alexander | Mar. 19, 1918 |
| 1,752,580 | Snell | Apr. 1, 1930 |
| 2,081,835 | Pierce | May 25, 1937 |
| 2,356,340 | Murphree | Aug. 22, 1944 |
| 2,369,992 | Treacy | Feb. 20, 1945 |
| 2,382,532 | Auer | Aug. 14, 1945 |
| 2,382,533 | Auer | Aug. 14, 1945 |